Feb. 7, 1956   J. J. EDIXON   2,733,929
TELESCOPIALLY EXPANSIBLE AND CONTRACTIBLE DOLLY
Filed June 22, 1954   2 Sheets-Sheet 1
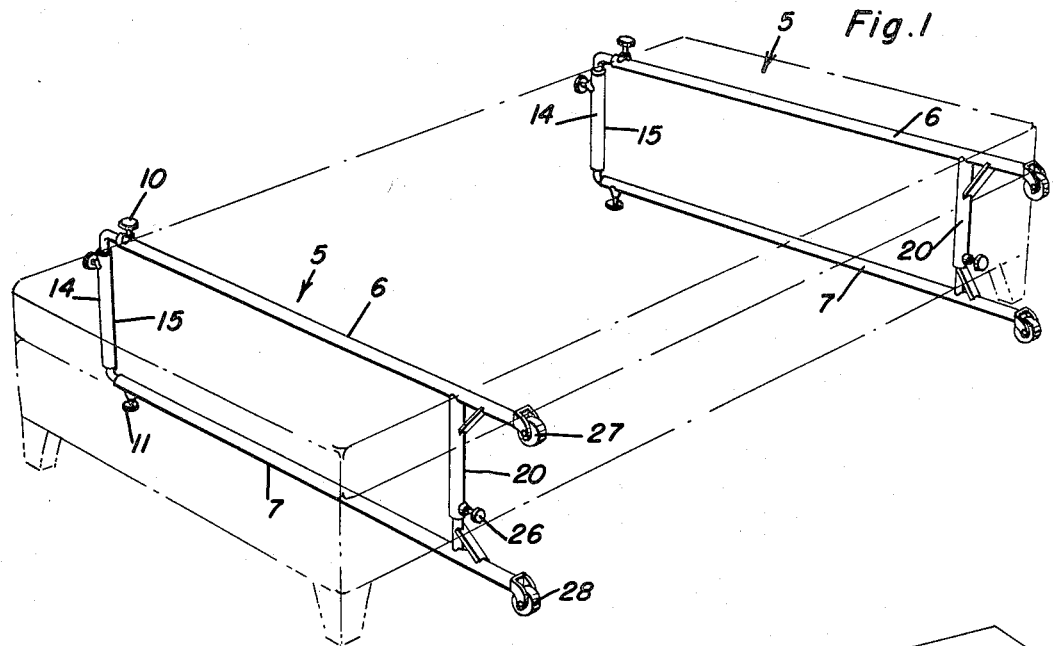
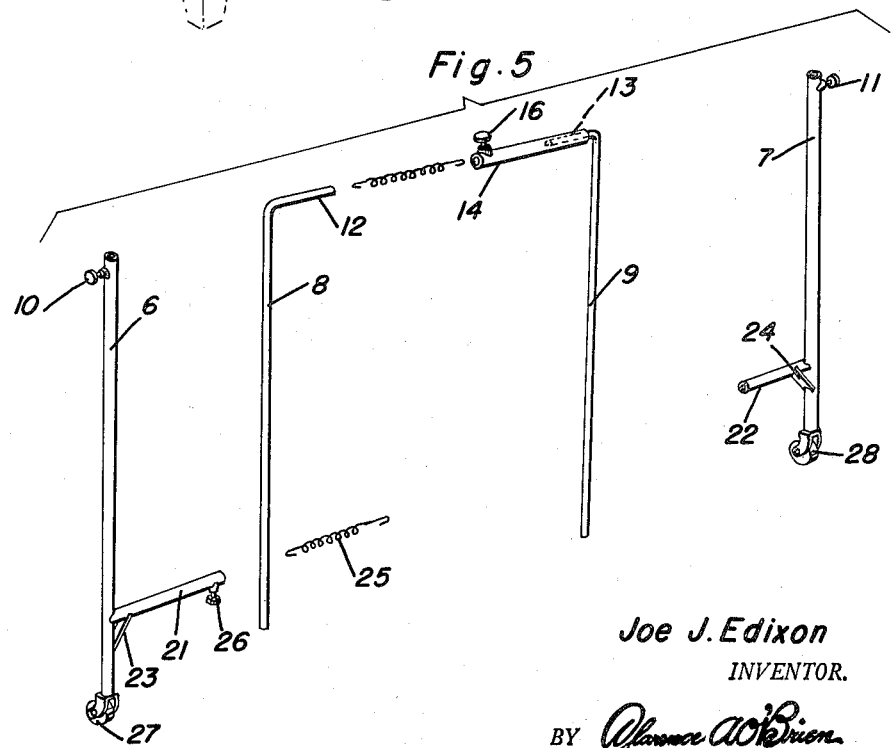
Joe J. Edixon
INVENTOR.

Feb. 7, 1956 J. J. EDIXON 2,733,929
TELESCOPIALLY EXPANSIBLE AND CONTRACTIBLE DOLLY
Filed June 22, 1954
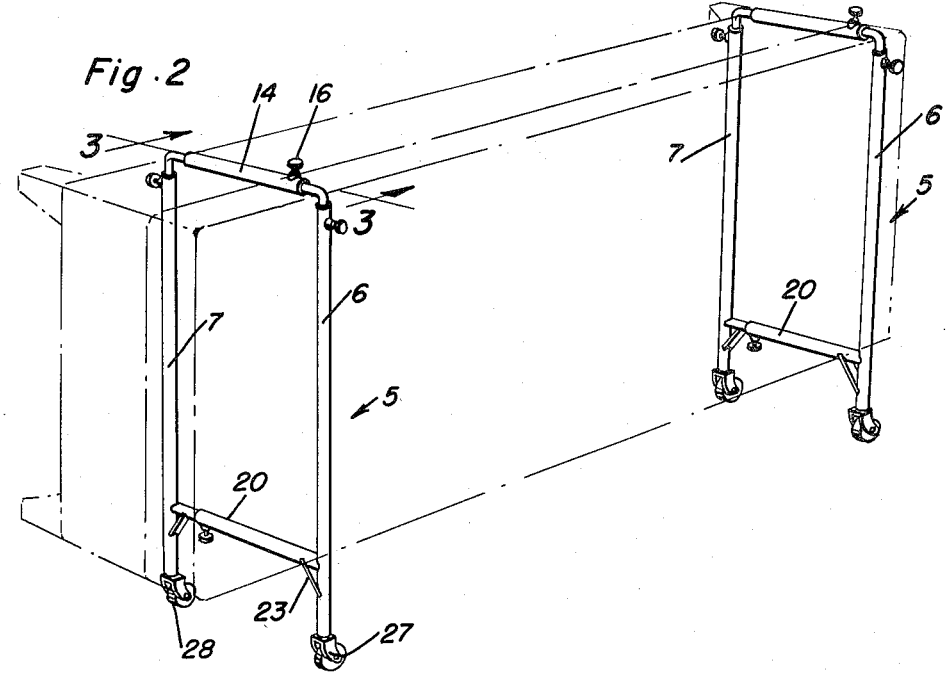
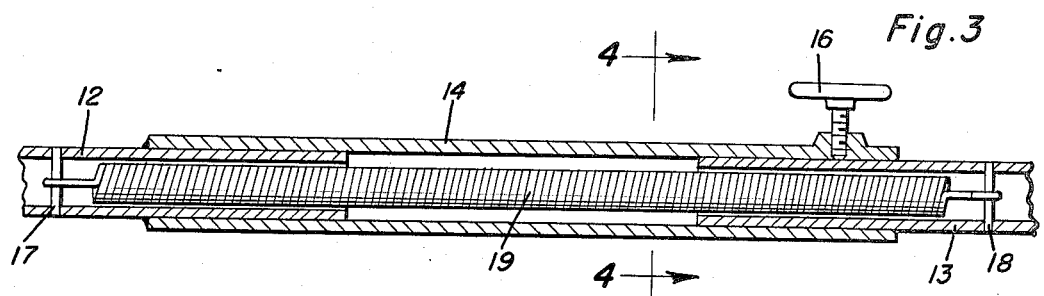
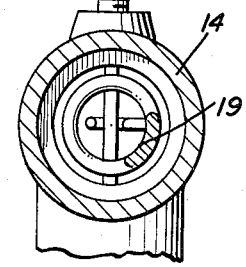
Joe J. Edixon
INVENTOR.

United States Patent Office 2,733,929
Patented Feb. 7, 1956

2,733,929

TELESCOPICALLY EXPANSIBLE AND CONTRACTIBLE DOLLY

Joe J. Edixon, Palm Desert, Calif.

Application June 22, 1954, Serial No. 438,474

1 Claim. (Cl. 280—35)

The present invention relates to new and useful improvements in dollys to facilitate handling and moving beds or similar bulky objects.

An important object of the invention is to provide a dolly which may be easily and quickly placed in position on a bed for moving the latter from one location to another without removing the spring, mattress or covers from the bed.

Another object is to provide a dolly composed of an adjustable, rectangular shaped frame in which a bed may be clamped and equipping one end of the frame with rollers on which the bed is supported by tilting the bed into an edgewise upstanding position to facilitate moving the bed through doorways or other narrow passageways.

A further object is to provide a device of this character of simple and practical construction, which is strong and durable, efficient and reliable in operation, relatively inexpensive to manufacture, and otherwise well adapted for the purpose for which the same is intended.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a perspective view showing the bed and dolly tilted in transporting position;

Figure 3 is an enlarged fragmentary longitudinal sectional view of one of the spring retracted ends of the frame and taken on a line 3—3 of Figure 2;

Figure 4 is a transverse sectional view taken on a line 4—4 of Figure 3; and

Figure 5 is a group perspective view of the frame members in detached position.

Referring now to the drawing in detail, wherein for the purpose of illustration I have disclosed a preferred embodiment of my invention, the numeral 5 designates a substantially rectangular shaped dolly frame composed of a pair of tubular metal legs 6 and 7 which form the longitudinal side members of the frame and in the upper ends of which inverted L-shaped tubular rods 8 and 9 are telescopically fitted and secured in extensibly adjusted position by setscrews, or the like, 10 and 11.

The horizontal outer end portions 12 and 13 of the rods 8 and 9 oppose each other and are telescopically fitted in the opposite ends of a tubular connector 14 to form an upper cross bar 15. End portion 13 is welded or otherwise fixed to the connector, while end portion 12 is slidable inwardly and outwardly of the connector and is secured in adjusted position by a setscrew 16. Transverse pins 17 and 18 are secured in the arms 12 and 13 and to which the ends of a coil spring 19 are attached for retracting end portion 12 in the connector.

A lower cross bar 20 is composed of telescopically fitted tubular members 21 and 22 welded at one end to the respective legs 6 and 7 at right angles thereto and at a point above the lower ends of the legs. Braces 23 and 24 are welded to the legs as well as to the members to support the latter. An internal coil spring 25 also connects the members 21 and 22 to each other to retract the same and the members 21 and 22 are secured in slidably adjusted position by a setscrew 26.

Casters or swivel rollers 27 and 28 are attached to the lower ends of the legs 6 and 7.

The dolly frames 5 are preferably used in pairs, as indicated in Figure 1, and each frame is expanded by loosening the setscrews 10, 11, 16 and 26 and placing the frames in a horizontal position over each end of a bed 29. Each frame is then contracted to tightly embrace the top, bottom and each side of the bed and the setscrews are then tightened to hold the frame in contracted position.

The bed is then tilted upwardly at its side remote from the rollers 27 and 28 to support the bed in an upright position on the rollers whereupon the bed may be easily moved on the pairs of dollys.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A dolly comprising a rectangular shaped frame composed of a pair of tubular metal legs, extensions telescopically fitted in the upper ends of the legs and having right angled tubular arms at their upper ends, a tubular connector in which one of said arms is slidably adjustable toward and from the other, means securing the arms in adjusted position to the connector, a coil spring internally of the connector and extending into said arms with terminals fixed in said arms for retracting the arms toward each other, lower tubular arms carried by the legs and telescopically connected to each other, spring means in the lower arms retracting the same, means securing the lower arms in adjustable retracted position, and load supporting rollers at the lower end of the legs, said right angled arms and said tubular connector enclosing and concealing said coil spring.

References Cited in the file of this patent

UNITED STATES PATENTS

| | | |
|---|---|---|
| 211,828 | Ash | Feb. 4, 1879 |
| 963,410 | Welshans | July 5, 1910 |
| 1,390,123 | Gilkey | Sept. 6, 1921 |
| 2,534,367 | Perrotta | Dec. 19, 1950 |